United States Patent [19]

Yokobori et al.

[11] 4,393,422

[45] Jul. 12, 1983

[54] DEVICE FOR DRIVING MAGNETIC TAPE

[75] Inventors: Nobuyoshi Yokobori, Osaka; Masashi Urayama, Neyagawa; Hiroshi Okamoto, Yao; Yoshiaki Igarashi, Ikomashi, all of Japan

[73] Assignee: Matsushita Electric Industrial Co., Ltd., Kadoma, Japan

[21] Appl. No.: 250,296

[22] Filed: Apr. 2, 1981

[30] Foreign Application Priority Data

Apr. 2, 1980 [JP] Japan .................................. 55-43956

[51] Int. Cl.³ ........................ G11B 15/52; G11B 19/28
[52] U.S. Cl. ..................................... 360/73; 360/72.2; 360/74.4
[58] Field of Search ........................ 360/73, 72.2, 74.4; 318/306, 311, 314, 326; 358/321, 323, 338

[56] References Cited

U.S. PATENT DOCUMENTS

| | | | |
|---|---|---|---|
| 3,849,795 | 11/1974 | Koda et al. | 360/73 |
| 4,127,881 | 11/1978 | Wakami et al. | 360/73 |
| 4,241,365 | 12/1980 | Koda et al. | 360/73 |
| 4,249,220 | 2/1981 | Yasutake et al. | 360/73 |
| 4,322,747 | 3/1982 | Dischert | 360/73 |
| 4,338,631 | 7/1982 | Ota | 360/73 |

*Primary Examiner*—Alfred H. Eddleman
*Attorney, Agent, or Firm*—Wenderoth, Lind & Ponack

[57] ABSTRACT

A device for intermittently driving a magnetic tape has a capstan for driving the magnetic tape, a motor directly connected to the capstan for driving the capstan, a tachometer for detecting the rotating speed of the motor and producing an output, and a speed control having a settable speed controller for setting a desired motor speed and into which the output from the tachometer is fed back for enabling the speed control to sense when the motor is rotating at the desired motor speed. An intermittent drive control is provided for supplying a triggering signal to trigger said settable speed controller to cause the settable speed controller to operate the speed control for accelerating the motor to the desired motor speed and driving it at that speed, the intermittent drive control supplying the triggering signal in response to a speed setting signal and a head switch signal. A detector for detecting a control signal recorded on the magnetic tape while the motor is being driven at the desired speed is connected to the intermittent drive control. The intermittent drive control is further responsive to the detection of the control signal for discontinuing the triggering signal after the passage of a predetermined period of time for causing the settable speed controller to decelerate the driving of the motor from the desired motor speed, whereby the position of the magnetic tape relative to the position of the recorded control signal at the end of the deceleration by the speed control is constant.

1 Claim, 5 Drawing Figures

TIMING CHART
OF PRIOR ART

DEVICE FOR DRIVING MAGNETIC TAPE

This invention relates to a magnetic-tape driving device effective for intermittent driving of the magnetic tape on a magnetic video recording and reproducing apparatus with a so-called helical scanning system in which video signals are recorded diagonally on the upper side of the magnetic tape and reproduced therefrom by a revolving magnetic head.

BACKGROUND OF THE INVENTION AND PRIOR ART

Among the magnetic video recording and reproducing apparatus (which will be designated VTR hereinafter) employing a helical scanning system, those which as shown in FIGS. 1 and 2 have been widely known. In these, the magnetic tape is intermittently driven for reproduction and is displaced a fixed distance for every action. In the apparatus shown in FIG. 1, a control signal recorded on the magnetic tape 1 is detected by the magnetic head 7 and, depending on this signal, the pinch roller 6 is moved away from the capstan 8 by driving the plunger 5 which is provided for this purpose, whereby intermittent transporting of the magnetic tape is obtained. The reference numeral 4 designates a circuit for driving the plunger.

The capstan 8 is driven by the motor 2 and the motor driving circuit 3 so as to rotate at the same speed as that during ordinary continuous running when intermittent feeding is not performed. As a result, the magnetic tape is intermittently driven every time the pinch roller 6 is pressed toward the capstan 8 to pinch the tape thereagainst.

In the apparatus shown in FIG. 2, the capstan 8 is connected to the motor 2 through a clutch 10. This clutch 10 is driven according to the control signal from the control circuit 9 and causes the capstan 8 to rotate intermittently and the magnetic tape to run intermittently.

Both devices of conventional type a shown in FIGS. 1 and 2 have such drawbacks that they have a complicated structure and make offensive noise due to necessity to provide such components as a plunger 6 and/or a clutch 10 which are not primarily driving elements for the tape. In addition, in these devices the tape speed increases so abruptly, as shown in FIG. 3, that the tape tension is made abnormally high, giving rise to a risk of damage to the tape itself or the revolving magnetic head.

OBJECT OF THE INVENTION

This invention has as its object to provide a magnetic-tape driving device which is absolutely free from the above described drawbacks and which permits simple and smooth intermittent running of the magnetic tape.

BRIEF DESCRIPTION OF THE DRAWINGS

The invention will now be described in greater detail with reference to the accompanying drawings, in which.

DETAILED DESCRIPTION OF THE INVENTION

Figure 1:
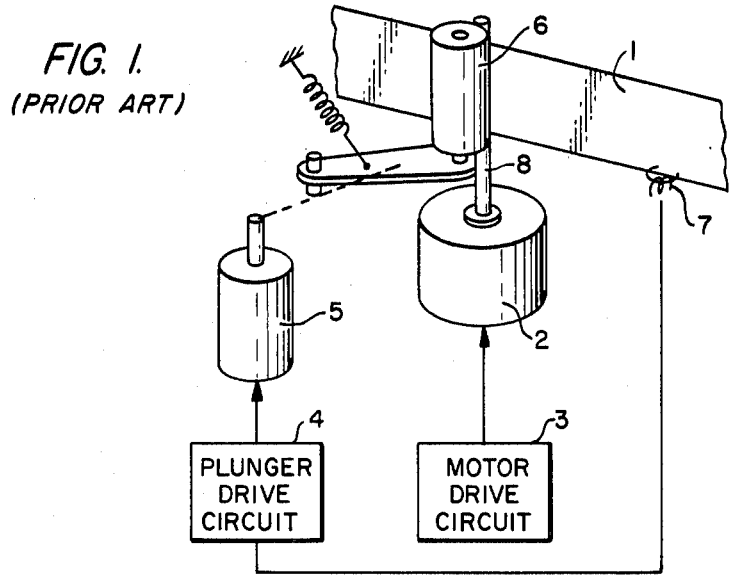
FIGS. 1 and 2 are views of the main parts of conventional devices.
Figure 2:
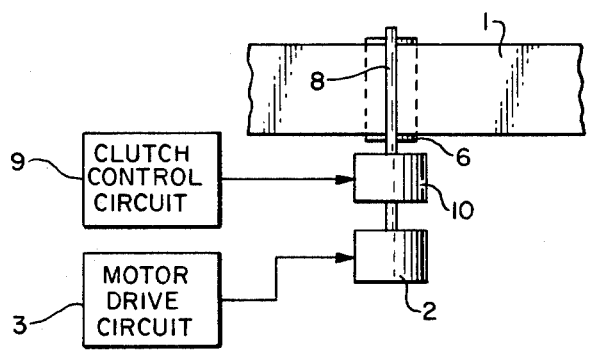
Figure 3:
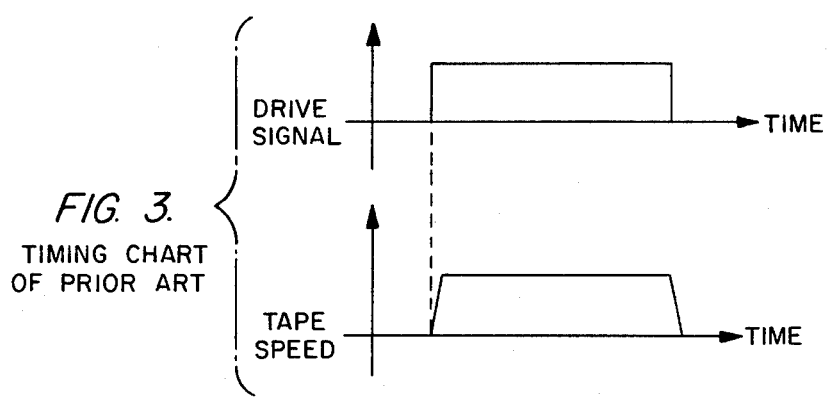
FIG. 3 is a timing chart thereof.
Figure 4:
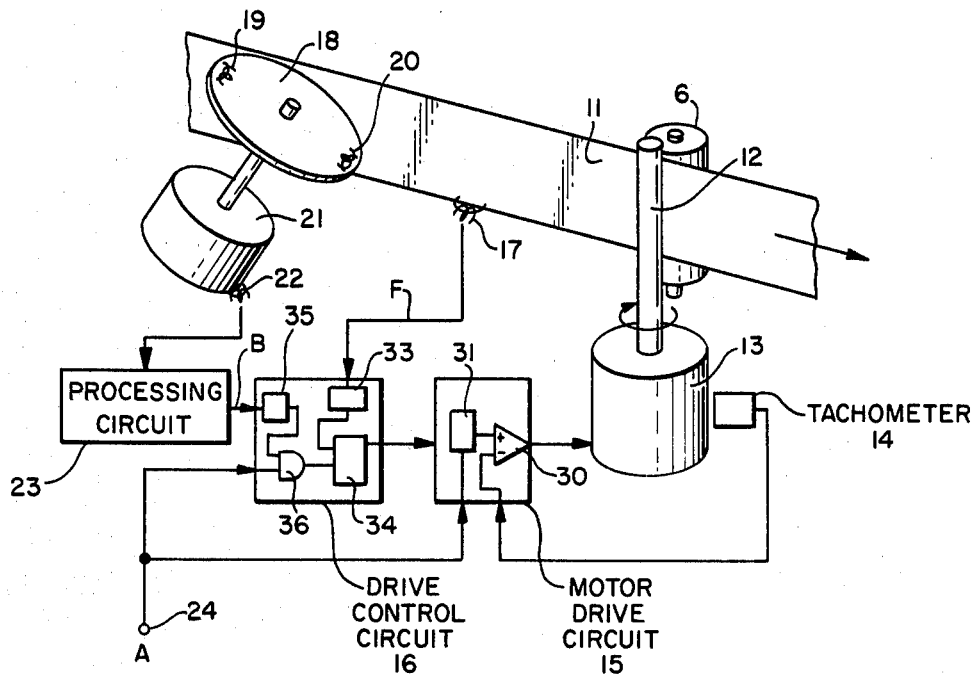
FIG. 4 is a view of the main parts of an embodiment of this invention.

In FIG. 4, the magnetic tap 11 is driven by the capstan 12 and the pinch roller 6, said capstan 12 being a so-called 'directly-driven capstan' structure in which the motor 13 and the capstan 12 are directly connected with each other. The rotational speed of the motor 13 is detected and converted into a signal proportional thereto by a tachometer 14. This signal is negatively fed back to a motor driving circuit 15 to form a constant speed control loop. The motor driving circuit 15 comprises a comparator amplifier 30 and a reference signal source 31.

The comparator amplifier 30 compares the fed back signal with a reference signal from the reference signal source 31 and drives the motor 31 at a constant speed determined by the reference signal. The reference signal source 31 is controlled by an intermittent drive setting signal A. Magnetic heads 19 and 20 for video signal recording/reproducing are fixed to a revolving cylinder 18 and driven by the directly connected motor 21. Signals corresponding to rotational phases of magnetic heads 19 and 20 are detected by the detector 22 and a head switch signal B is produced therefrom by the processing circuit 23. The intermittent drive control circuit 16 comprises a delay circuit 33, a flip-flop 34, a delay circuit 35 and a gate 36. The gate 36 accepts the delayed head switch signal B from the delay circuit 35 and the intermittent drive setting signal A to set the flip-flop 34. A reproducing control signal F which is an output from a control signal head 17 for detecting control signals recorded on the magnetic tape 11 is delayed by the delay circuit 33 and resets the flip-flop 34. The flip-flop 34 supplies an output signal from the intermittent drive control circuit 16 to control the motor driving circuit 15 as described below.

Figure 5:
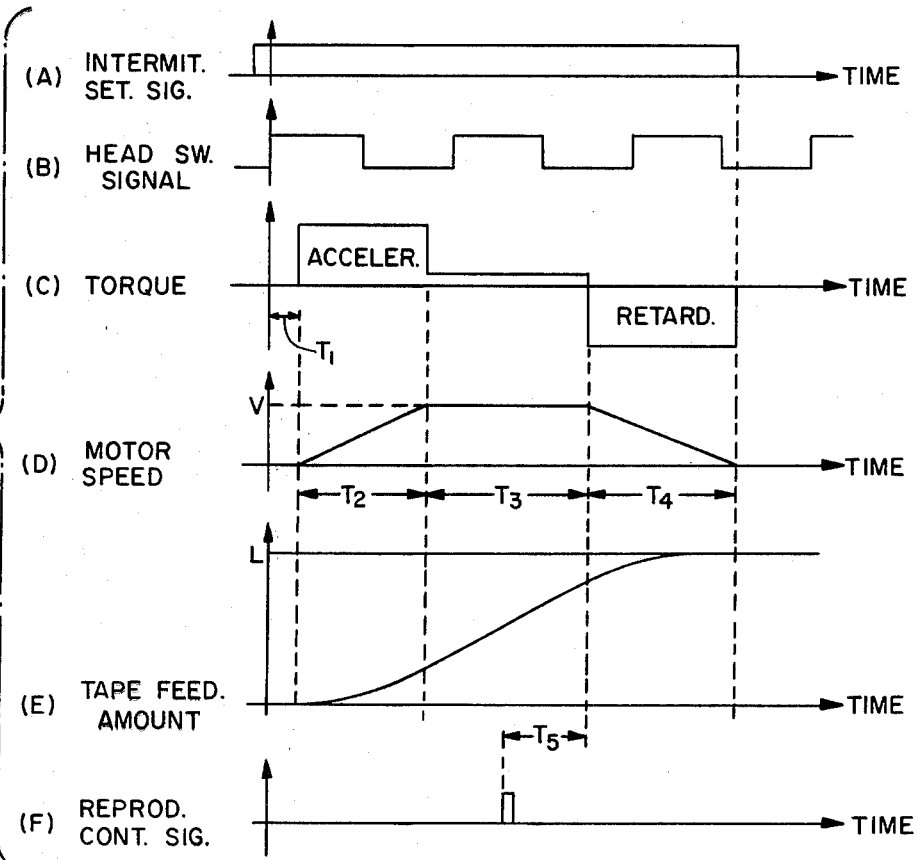
FIG. 5 is a timing chart thereof.

FIG. 5 is a timing chart of one cycle of intermittent driving of the device shown in FIG. 4. The intermittent drive setting signal A shown in FIG. 5 (A) is impressed on the terminal 24 shown in FIG. 4 at a desired time. For example, in the case of slow motion reproduction which depends on intermittent feeding of the magnetic tape, the intermittent drive setting signal A is emitted with timing corresponding to the slow motion ratio. The intermittent drive setting signal A sets the reference signal source 31 to generate a reference signal corresponding to a motor speed V which is different from that ($V_o$) during running for a normal reproduction, i.e., running speed at the time of recording and, at the same time, opens the gate 36. The head switch signal B is delayed by a fixed period of time $T_1$ by the delay circuit 35 and sets the flip-flop 34 through the open gate 36. The output of the flip-flop 34, i.e., the output of the intermittent drive control circuit 16 activates the motor driving circuit 15. The motor 13 is at a previous condition of running before the motor driving circuit 15 is triggered, and is accelerated by driving torque generated due to action of the speed control loop after said circuit is triggered. The rotating speed of motor increases rectilinearly while accelerating torque is generated at a fixed rate, and reaches the set speed as shown in curve D of FIG. 5. Subsequently, a constant speed V is maintained because of the decrease in accelerating torque by the speed control loop. The magnetic tape 11 runs as shown in curve E of FIG. 5 and the distance of travel thereof is obtained in terms of the integrated value of the motor speed. During the running of the tape, the reproduction control signal F as shown in curve F of FIG. 5 is detected by the control signal head 17 and is delayed for a period of time $T_5$ by the delay circuit 33 and then resets the flip-flop 34. The motor control circuit 15 is then placed in a retardation state after the flip-flop 34 is reset. Torque of the motor at this time is as shown in curve C of FIG. 5. Since the motor 13 is retarded by the retarding torque, the distance of travel of the tape varies as shown in curve E of FIG. 5. Time $T_4$ is set so that the distance of travel of the tape will have a value (L) as desired at the time when the motor 13 is stopped after the passage of time $T_4$. In this case, the time $T_3$ during which the motor 13 revolves at a fixed speed V is determined by the generating torque and load torque of the motor 13, the moment of inertia of the motor 13, and the distance (L) of travel of the tape.

In order to ensure stability during intermittent feeding of the tape at the time of an extraneous disturbance, the reproduction control signal F is adapted to be detected when the magnetic tap 11 runs at a fixed speed, for which the requirement is $T_3 > 0$. In other words, there must be a length of time during which the motor 13 revolves at a fixed speed V. The fixed speed V to meet this requirement is denoted as follows:

$$V < \sqrt{LT/J}$$

where:
- T: accelerating torque of the motor 13 (generating torque-load torque)
- J: moment of inertia of the capstan 12 and the motor 13
- L: distance of travel of the tape during the intermittent performance When the tape speed is set higher than the value according to the above formula, the length of time during which retardation torque is impressed is directly influenced by a variation in load on the tape where the variation in distance of travel of the tape for every action becomes large. That is to say, the timing of the detection of the reproduction control signal F varies for every detection, loosing stability of the intermittent action.

In the above formula, when the ratio between the acceleration torque and the moment of inertia, namely T/J, in increased, a value V increases and causes, when increased too much, the magnetic tape and the revolving head to be broken. In this embodiment, when the tape is intended to be displaced a distance equivalent to one frame (in the case of VHS standard recording: 1.11 mm) for every intermittent action, the value V is set to be $V < 0.8 V_o$ as a practical value. That is, the tape speed during intermittent action is set so as to be less than 0.8 times that at the time of recording where stability in performance every time is obtained by causing the reproduction control signal F to be detected during the period of fixed speed running.

As hitherto described, this invention enables intermittent driving of the magnetic tape on the VTR using a helical scanning system by controlling only two components, namely a capstan necessary for tape driving and the motor for driving said capstan without damaging the magnetic tape or magnetic head and while maintaining stability easily, exhibiting a significant effect upon the operation of the apparatus.

What is claimed is:

1. A device for intermittently driving a magnetic tape comprising:
    a capstan for driving said magnetic tape;
    a motor directly connected to said capstan for driving the capstan;
    a tachometer for detecting the rotating speed of said motor and producing an output;
    a speed control means having a settable speed means for setting a desired motor speed and into which the output from said tachometer is fed back for enabling said speed control means to sense when said motor is rotating at the desired motor speed;
    an intermittent drive control means for supplying a triggering signal to trigger said settable speed means to cause said settable speed means to operate said speed control means for accelerating said motor to the desired motor speed and driving it at said speed, said intermittent drive control means including means for generating said triggering signal in response to a speed setting signal and a head switch signal; and
    means for detecting a control signal recorded on said magnetic tape while said motor is being driven at said desired speed and connected to said intermittent drive control means;
    said intermittent drive control means further having means responsive to the detection of said control signal for discontinuing said triggering signal after the passage of a predetermined period of time for causing said settable speed means to decelerate the driving of said motor from said desired motor speed, whereby the position of said magnetic tape relative to the position of the recorded control pulse at the end of the deceleration by said speed control means is constant.

* * * * *